United States Patent
Tsujio et al.

(10) Patent No.: US 10,372,361 B2
(45) Date of Patent: Aug. 6, 2019

(54) DATA STORAGE DEVICE INCLUDING MULTIPLE MEMORY MODULES AND CIRCUITRY TO MANAGE COMMUNICATION AMONG THE MULTIPLE MEMORY MODULES

(71) Applicant: MITSUBISHI ELECTRIC CORPORATION, Chiyoda-ku (JP)

(72) Inventors: Ryota Tsujio, Tokyo (JP); Tetsuro Kato, Tokyo (JP); Yasunori Ido, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/121,136

(22) PCT Filed: Feb. 27, 2014

(86) PCT No.: PCT/JP2014/054792
§ 371 (c)(1),
(2) Date: Aug. 24, 2016

(87) PCT Pub. No.: WO2015/128976
PCT Pub. Date: Sep. 3, 2015

(65) Prior Publication Data
US 2017/0220286 A1 Aug. 3, 2017

(51) Int. Cl.
*G06F 3/06* (2006.01)
*G06F 11/14* (2006.01)
(Continued)

(52) U.S. Cl.
CPC ............ *G06F 3/0631* (2013.01); *G06F 3/061* (2013.01); *G06F 3/0619* (2013.01);
(Continued)

(58) Field of Classification Search
CPC .... G06F 3/0631; G06F 3/0685; G06F 3/0647; G06F 3/061; G06F 3/0619
See application file for complete search history.

(56) References Cited

U.S. PATENT DOCUMENTS

| | | |
|---|---|---|
| 5,295,258 A | 3/1994 | Jewett et al. |
| 5,317,752 A | 5/1994 | Jewett et al. |
| (Continued) | | |

FOREIGN PATENT DOCUMENTS

| | | |
|---|---|---|
| JP | 5-158797 A | 6/1993 |
| JP | 7-20994 A | 1/1995 |
| (Continued) | | |

OTHER PUBLICATIONS

International Search Report dated May 27, 2014 in PCT/JP2014/054792 filed Feb. 27, 2014.

(Continued)

*Primary Examiner* — Michael Alsip
(74) *Attorney, Agent, or Firm* — Oblon, McClelland, Maier & Neustadt, L.L.P.

(57) ABSTRACT

A memory system includes a plurality of volatile memory modules to temporarily store data in a distributed manner, a V storing place management unit included in each of the volatile memory modules, a plurality of nonvolatile memory modules to store the data stored in each of the volatile memory modules in a distributed manner, and a NV storing place management unit included in each of the nonvolatile memory modules. Each V storing place management unit and each NV storing place management unit communicate and determine the destination nonvolatile memory module for each volatile memory module. The data is transmitted to the determined destination nonvolatile memory module and stored in the destination nonvolatile memory module.

7 Claims, 14 Drawing Sheets

(51) Int. Cl.
*H04L 12/747* (2013.01)
*G06F 12/0866* (2016.01)

(52) U.S. Cl.
CPC .......... *G06F 3/0647* (2013.01); *G06F 3/0685* (2013.01); *G06F 11/142* (2013.01); *G06F 12/0866* (2013.01); *H04L 45/742* (2013.01); *G06F 2212/261* (2013.01); *G06F 2212/285* (2013.01); *G06F 2212/313* (2013.01)

(56) References Cited

U.S. PATENT DOCUMENTS

| | | | |
|---|---|---|---|
| 5,327,553 | A | 7/1994 | Jewett et al. |
| 5,459,856 | A | 10/1995 | Inoue |
| 5,603,058 | A | 2/1997 | Belknap et al. |
| 5,668,948 | A | 9/1997 | Belknap et al. |
| 5,689,729 | A | 11/1997 | Inoue |
| 5,712,976 | A | 1/1998 | Falcon, Jr. et al. |
| 5,761,417 | A | 6/1998 | Henley et al. |
| 5,819,054 | A | 10/1998 | Ninomiya et al. |
| 5,951,655 | A | 9/1999 | Inoue |
| 6,012,119 | A | 1/2000 | Ninomiya et al. |
| 6,073,251 | A | 6/2000 | Jewett et al. |
| 6,263,452 | B1 | 7/2001 | Jewett et al. |
| 6,578,100 | B1 | 6/2003 | Ninomiya et al. |
| 6,581,128 | B2 | 6/2003 | Ninomiya et al. |
| 6,745,261 | B2 | 6/2004 | Inoue |
| 6,981,066 | B2 | 12/2005 | Inoue |
| 6,981,067 | B2 | 12/2005 | Inoue |
| 6,996,690 | B2 * | 2/2006 | Nakamura .......... G06F 11/1666 711/161 |
| 7,010,623 | B2 | 3/2006 | Inoue |
| 7,099,960 | B2 | 8/2006 | Inoue |
| 7,120,738 | B2 | 10/2006 | Ninomiya et al. |
| 7,219,166 | B2 | 5/2007 | Inoue |
| 7,243,166 | B2 | 7/2007 | Inoue |
| 7,330,909 | B2 | 2/2008 | Inoue |
| 7,444,467 | B2 | 10/2008 | Ninomiya et al. |
| 7,702,819 | B2 | 4/2010 | Inoue |
| 8,549,381 | B2 | 10/2013 | Kitahara et al. |
| 8,677,068 | B2 | 3/2014 | Canepa et al. |
| 8,806,300 | B2 | 8/2014 | Kitahara et al. |
| 2003/0101317 | A1 | 5/2003 | Mizuno et al. |
| 2013/0159622 | A1 | 6/2013 | Cohen |

FOREIGN PATENT DOCUMENTS

| | | |
|---|---|---|
| JP | 8-154236 A | 6/1996 |
| JP | 2000-112584 A | 4/2000 |
| JP | 2004-192482 A | 7/2004 |
| JP | 2005-43930 A | 2/2005 |
| JP | 2007-310915 A | 11/2007 |
| JP | 2007-323103 A | 12/2007 |
| JP | 2012-519319 A | 8/2012 |
| JP | 2013-532339 A | 8/2013 |

OTHER PUBLICATIONS

Extended European Search Report dated Oct. 5, 2017 in Patent Application No. 14883990.5.

* cited by examiner

Fig. 2

1346 : NONVOLATILE MEMORY MANAGEMENT TABLE

| NONVOLATILE MEMORY MODULE NUMBER | FAILURE INFORMATION | CONNECTION REQUEST |
|---|---|---|
| 0 | OPERATIONAL | SENT |
| 1 | FAILED | NOT SENT |
| 2 | OPERATIONAL | SENT |
| 3 | OPERATIONAL | NOT SENT |

Fig. 3

1446 : VOLATILE MEMORY MANAGEMENT TABLE

| VOLATILE MEMORY MODULE NUMBER | FAILURE INFORMATION | NUMBER OF PATHS | GRANT OF USE RIGHT |
|---|---|---|---|
| 0 | FAILED | 4 | NOT GRANTED |
| 1 | OPERATIONAL | 4 | NOT GRANTED |
| 2 | OPERATIONAL | 3 | GRANTED |
| 3 | OPERATIONAL | 4 | NOT GRANTED |

Fig. 7

| MEMORY MODULE NUMBER OF DESTINATION | MEMORY MODULE NUMBER OF SOURCE |
|---|---|

Fig. 8

| MEMORY MODULE NUMBER OF DESTINATION | MEMORY MODULE NUMBER OF SOURCE |
|---|---|

Fig. 10

| NONVOLATILE MEMORY MODULE NUMBER OF DESTINATION | VOLATILE MEMORY MODULE NUMBER OF SOURCE | NUMBER OF PATHS OF VOLATILE MEMORY MODULE |
|---|---|---|

Fig. 11

| VOLATILE MEMORY MODULE NUMBER OF DESTINATION | NONVOLATILE MEMORY MODULE NUMBER OF SOURCE | WHETHER CONNECTION IS ACCEPTED |
|---|---|---|

DATA STORAGE DEVICE INCLUDING MULTIPLE MEMORY MODULES AND CIRCUITRY TO MANAGE COMMUNICATION AMONG THE MULTIPLE MEMORY MODULES

TECHNICAL FIELD

The present invention relates to a data storage device including a cache memory.

BACKGROUND ART

A volatile memory module (one example of cache memory) is introduced to memory systems in order to enhance writing speed of the memory system including a plurality of nonvolatile memory modules. The volatile memory module temporarily stores data to write data in parallel to the plurality of nonvolatile memory modules.

When a failure occurs in the volatile memory module or nonvolatile memory module, writing speed to the memory system may be degraded or the system may halt.

In a memory system described in Patent Literature 1, a plurality of volatile memory modules and a plurality of nonvolatile memory modules are connected by an interconnection network in a multipoint-to-multipoint manner, thereby allowing data to be redundant with the volatile memory modules sharing the same nonvolatile memory module. As a result, response speed and reliability of write access are maintained even upon failure of the memory module.

In a memory system described in Patent Literature 2, a path is determined by peer-to-peer communication to arbitrarily determine a path between memory modules connected in a multipoint-to-multipoint manner.

CITATION LIST

Patent Literature

Patent Literature 1: JP 2005-43930 A
Patent Literature 2: JP 2013-532339 A

SUMMARY OF INVENTION

Technical Problem

When connection of memory modules is in a multipoint-to-multipoint manner, it is required to determine a path of data transfer among volatile memory modules and nonvolatile memory modules upon writing data to the nonvolatile memory module. To determine a path, a mechanism to integrally manage and control information such as data storing places and a crossbar switch circuit are required.

However, when the mechanism to integrally manage/control information such as data storing places or the crossbar switch circuit fails, the entire memory system halts operation.

An object of the present invention is to implement multipoint-to-multipoint connection of memory modules without using a mechanism to integrally manage/control information such as data storing places and a crossbar switch circuit.

Solution to Problem

A data storage device according to the present invention includes:

a plurality of first memory modules to temporarily store data;

a first storing place management unit included in each of the first memory modules;

a plurality of second memory modules to store data stored in each of the first memory modules; and a second storing place management unit included in each of the second memory modules, wherein the first storing place management unit included in each of the first memory modules and the second storing place management unit included in each of the second memory modules communicate and determine, for each first memory module storing data, the second memory module as a destination of the data, and each of the first memory modules transmits data to the second memory module determined as the destination.

Advantageous Effects of Invention

In a data storage device according to the present invention, a storing place management unit included in each memory module determines a path. Therefore, a mechanism to integrally manage/control information such as data storing places and a crossbar switch circuit are not required.

BRIEF DESCRIPTION OF DRAWINGS

FIG. 2 is a diagram illustrating a nonvolatile memory management table 1346.

FIG. 3 is a diagram illustrating a volatile memory management table 1446.

FIG. 7 is a configuration diagram illustrating a HELLO packet.

FIG. 8 is a configuration diagram illustrating a HELLO response packet.

FIG. 10 is a configuration diagram illustrating a connection request packet.

FIG. 11 is a configuration diagram illustrating a connection response packet.

DESCRIPTION OF EMBODIMENTS

First Embodiment

Figure 1:
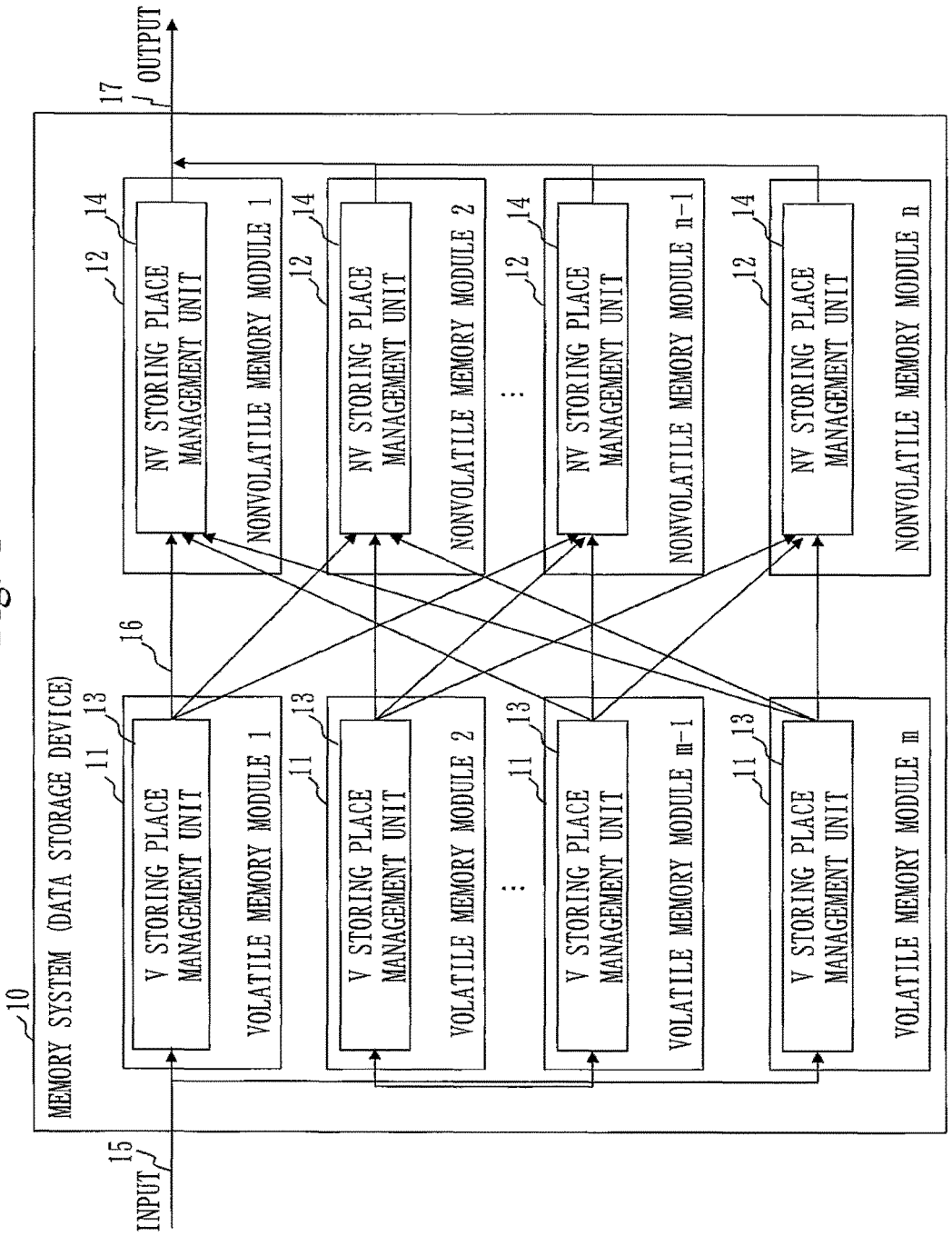
FIG. 1 is a configuration diagram illustrating a memory system 10 according to a first embodiment.

FIG. 1 is a configuration diagram illustrating a memory system 10 (data storage device) according to a first embodiment.

The memory system 10 includes a plurality of volatile memory modules 11 (first memory modules) and a plurality of nonvolatile memory modules 12 (second memory modules). Each of the volatile memory modules 11 includes a V storing place management unit 13 (first storing place management unit). Each of the nonvolatile memory modules 12 includes a NV storing place management unit 14 (second storing place management unit).

Each of the volatile memory modules 11 may be, for example, a dynamic random access memory (DRAM) module and each of the nonvolatile memory modules 12 may be, for example, a flash memory module.

Each of the volatile memory modules 11 is connected with an external input bus 15. Each of the volatile memory modules 11 temporarily stores data input via the external input bus 15 in a distributed manner.

Each of the volatile memory modules 11 and each of the nonvolatile memory modules 12 are connected by an inter-memory module bus 16. The number of ports of each of the volatile memory modules 11 and each of the nonvolatile memory modules 12 is limited and thus not all the volatile memory modules 11 and all the nonvolatile memory modules 12 are connected with each other.

Each of the nonvolatile memory modules 12 is connected with an external output bus 17. Each of the nonvolatile memory modules 12 stores data transmitted from the volatile memory module 11 via the inter-memory module bus 16. Each of the nonvolatile memory modules 12 outputs stored data via the external output bus 17.

The V storing place management unit 13 includes a nonvolatile memory management table 1346 and the NV storing place management unit 14 includes a volatile memory management table 1446. The V storing place management unit 13 and NV storing place management unit 14 communicate with each other, update the nonvolatile memory management table 1346 and volatile memory management table 1446, and thereby determine a data transfer path. Each of the volatile memory modules 11 transmits temporarily-stored data to the nonvolatile memory module 12 indicated by the determined data transfer path.

Incidentally, a failure of the volatile memory module 11 or nonvolatile memory module 12 may degrade performance (data writing speed) of the memory system 10. In order to avoid degradation of performance, the memory system 10 includes the volatile memory modules 11 and nonvolatile memory modules 12 in a redundant manner. That is, a part of the plurality of volatile memory modules 11 and a part of the plurality of nonvolatile memory modules 12 are in a stand-by state for back-up.

FIG. 2 is a diagram illustrating the nonvolatile memory management table 1346.

The nonvolatile memory management table 1346 includes nonvolatile memory module numbers, failure information, and connection request.

The nonvolatile memory module number is an identifier of the nonvolatile memory module 12. In FIG. 1, n nonvolatile memory modules 12 are illustrated from No. 1 to No. n, which is the nonvolatile memory module number. The failure information indicates whether the nonvolatile memory module 12 has failed. The connection request is information indicating whether connection request has been issued to the nonvolatile memory module 12.

FIG. 3 is a diagram illustrating the volatile memory management table 1446.

The volatile memory management table 1446 includes volatile memory module numbers, failure information, the number of paths, and grant of use right.

The volatile memory module number is an identifier of the volatile memory module 11. In FIG. 1, in volatile memory modules 11 are illustrated from No. 1 to No. m, which is the volatile memory module number. The failure information indicates whether the volatile memory module 11 has failed. The number of paths is the number of nonvolatile memory modules 12 which is connected to the volatile memory module 11 and has not failed. The grant of use right is information indicating whether connection request is accepted.

Figure 4:
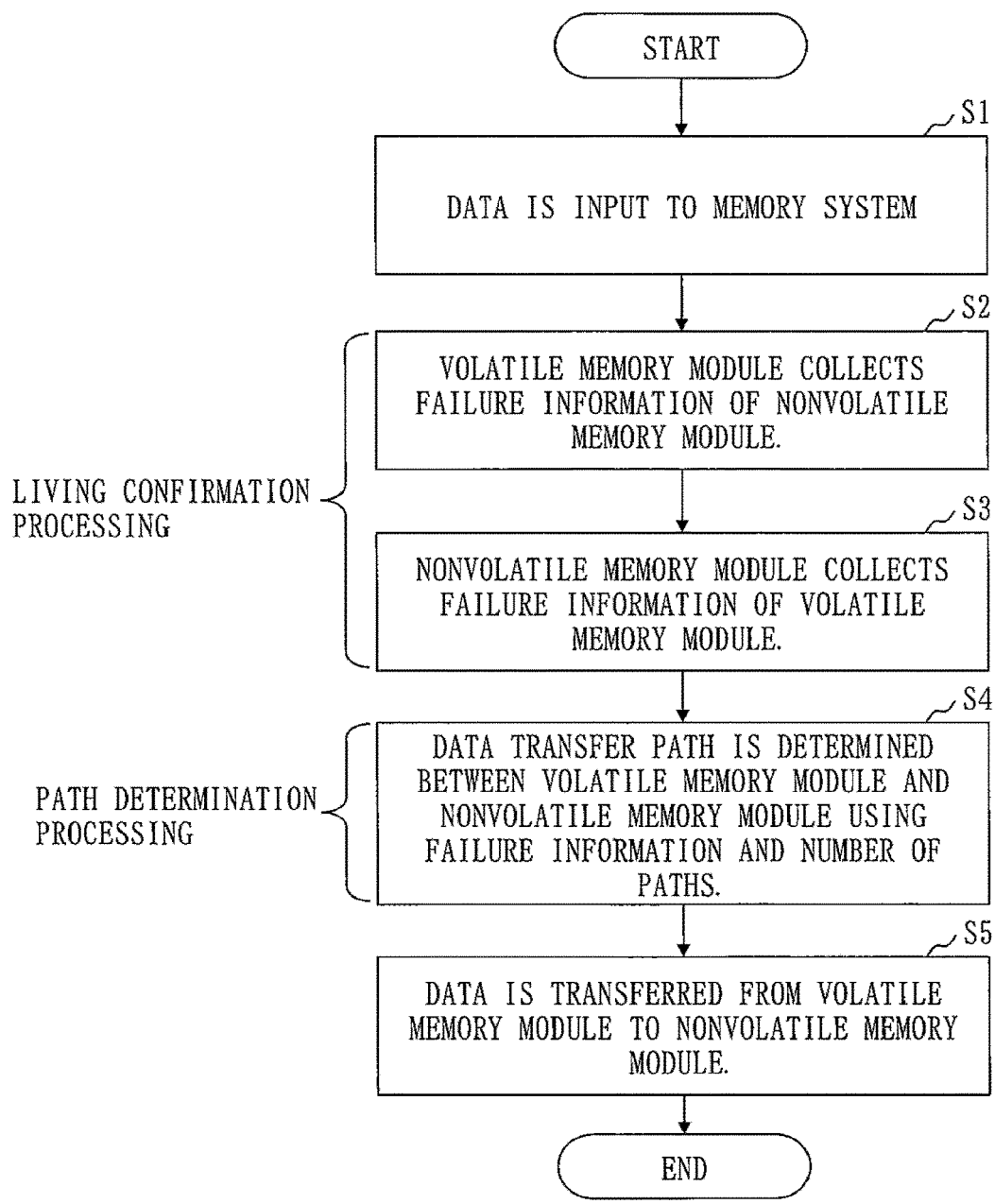
FIG. 4 is a flowchart illustrating operations of the memory system 10.

FIG. 4 is a flowchart illustrating operations of the memory system 10.

(S1: Data Input Processing)

Data is input to the memory system 10. The data is then input to each of the volatile memory modules 11 via the external input bus 15 and stored in each of the volatile memory modules 11 in a distributed manner.

(S2: First Living Confirmation Processing)

The V storing place management unit 13 of each of the volatile memory modules 11 collects failure information of the nonvolatile memory module 12.

Figure 5:
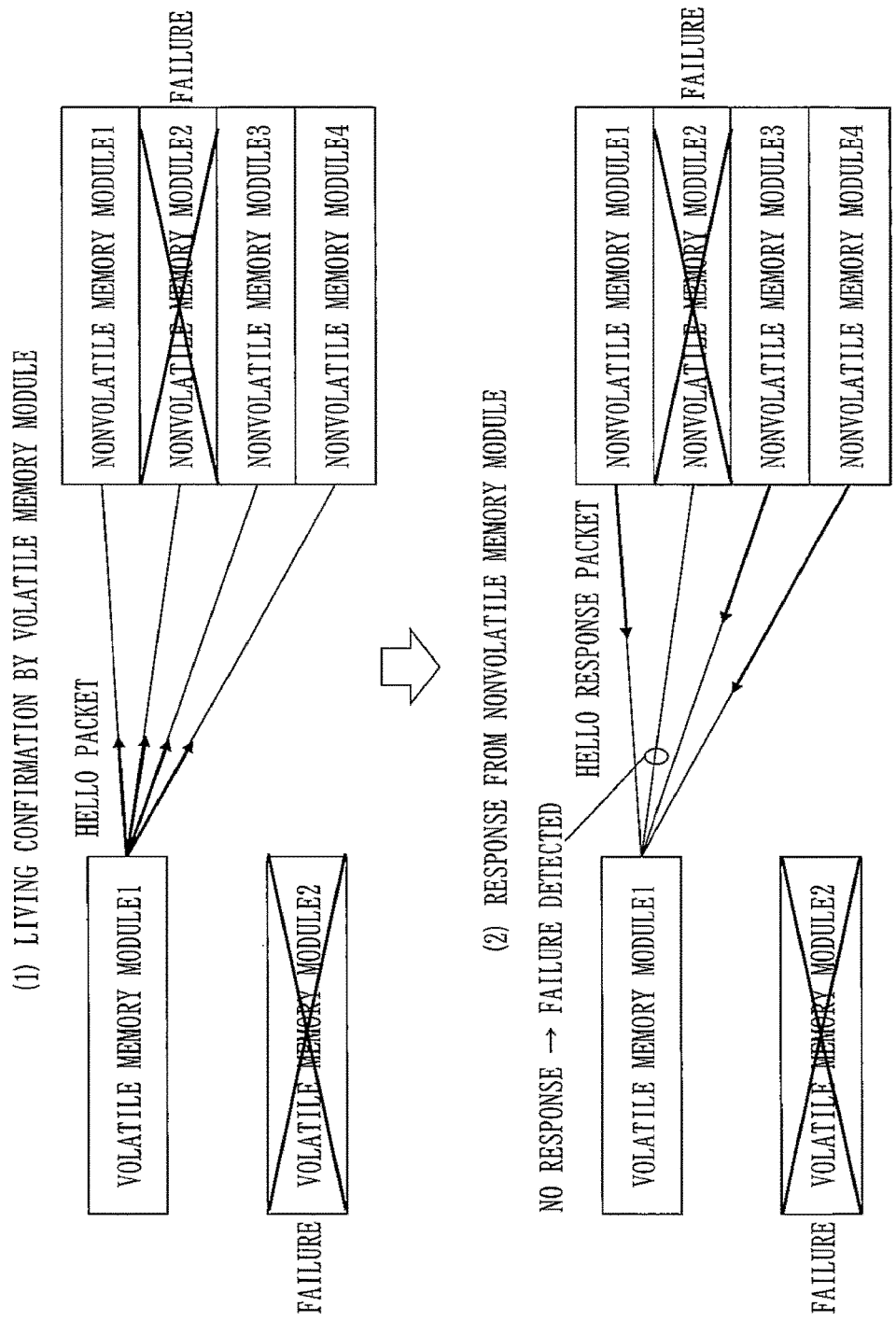
FIG. 5 is a diagram explaining collection processing of failure information of a nonvolatile memory module 12.

FIG. 5 is a diagram explaining collection processing of failure information of the nonvolatile memory module 12.

The V storing place management unit 13 of the volatile memory module 11 transmits a HELLO packet (living confirmation message) to the NV storing place management unit 14 of all connected nonvolatile memory modules 12 (1). The NV storing place management unit 14 of the nonvolatile memory module 12 having received the HELLO packet transmits a HELLO response packet to the V storing place management unit 13 of the volatile memory module 11 (2).

The V storing place management unit 13 of the volatile memory module 11 recognizes the nonvolatile memory module 12, which has transmitted the HELLO response packet in response to the transmitted HELLO packet, as in operation (not failed). On the other hand, the V storing place management unit 13 of the volatile memory module 11 recognizes the nonvolatile memory module 12, which has not transmitted the HELLO response packet within a predetermined time, as not in operation (failed). Thereafter, the V storing place management unit 13 of the volatile memory module 11 updates failure information of the nonvolatile memory management table 1346.

(S3: Second Living Confirmation Processing)

The NV storing place management unit 14 of the nonvolatile memory module 12 collects failure information of the volatile memory module 11.

Figure 6:
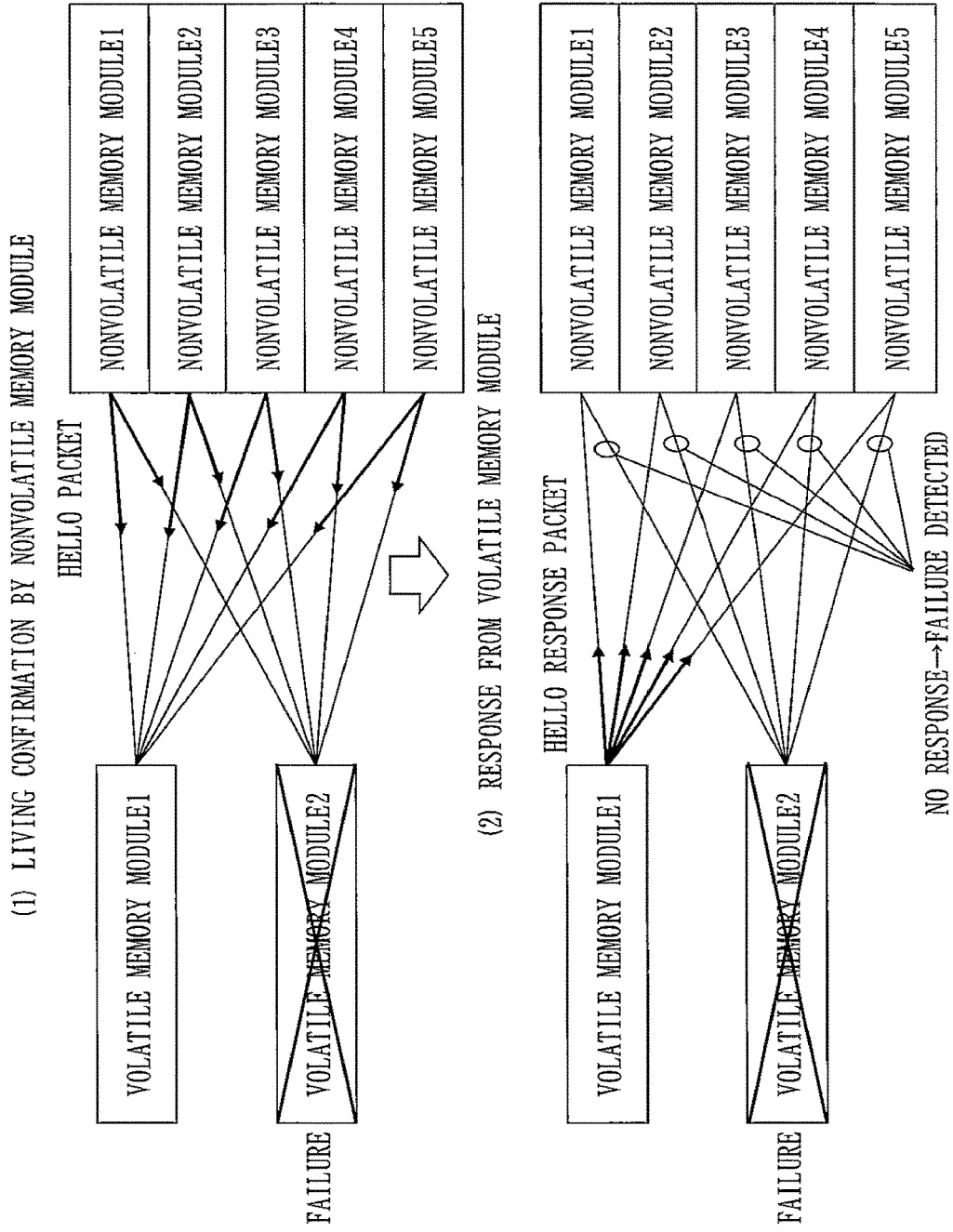
FIG. 6 is a diagram explaining collection processing of failure information of a volatile memory module 11.

FIG. 6 is a diagram explaining collection processing of failure information of the volatile memory module 11.

The NV storing place management unit 14 of the nonvolatile memory module 12 transmits a HELLO packet to the V storing place management unit 13 of all connected volatile memory modules 11 (1). The V storing place management unit 13 of the volatile memory module 11 having received the HELLO packet transmits a HELLO response packet to the NV storing place management unit 14 of the nonvolatile memory module 12 (2).

The NV storing place management unit 14 of the nonvolatile memory module 12 recognizes the volatile memory module 11, which has transmitted the HELLO response packet in response to the transmitted HELLO packet, as in operation (not failed). On the other hand, the NV storing place management unit 14 of the nonvolatile memory module 12 recognizes the volatile memory module 11, which has not transmitted the HELLO response packet within a predetermined time, as not in operation (failed). Thereafter, the NV storing place management unit 14 of the nonvolatile memory module 12 updates failure information of the volatile memory management table 1446.

FIG. 7 is a configuration diagram illustrating the HELLO packet.

The HELLO packet includes a memory module number of a destination and a memory module number of a source.

When the V storing place management unit 13 of the volatile memory module 11 transmits the HELLO packet, the memory module number of the destination is the nonvolatile memory module number of the destination nonvolatile memory module 12 while the memory module number of the source is the volatile memory module number of the source volatile memory module 11. Meanwhile, when the NV storing place management unit 14 of the nonvolatile memory module 12 transmits the HELLO packet, the memory module number of the destination is the volatile memory module number of the destination volatile memory module 11 while the memory module number of the source is the nonvolatile memory module number of the source nonvolatile memory module 12.

FIG. 8 is a configuration diagram illustrating the HELLO response packet.

The HELLO response packet includes a memory module number of a destination and a memory module number of a source.

The memory module number of a destination and memory module number of a source of the HELLO response packet are the same as those of the HELLO packet and thus descriptions thereon are omitted.

The first living confirmation processing of S2 and second living confirmation processing of S3 are collectively referred to as living confirmation processing.

In the living confirmation processing, the V storing place management unit 13 of the volatile memory module 11 in a stand-by state and the NV storing place management unit 14 of the nonvolatile memory module 12 in the stand-by state do not transmit the HELLO packet or HELLO response packet.

When failure of the nonvolatile memory module 12 is detected in living confirmation processing, the V storing place management unit 13 of the volatile memory module 11 transmits a WAKEUP packet to the nonvolatile memory module 12 in the stand-by state. The nonvolatile memory module 12 in the stand-by state is caused to be in an operational state upon receiving the WAKEUP packet and changes to a state to transmit the HELLO packet and HELLO response packet.

Similarly, when failure of the volatile memory module 11 is detected in living confirmation processing, the NV storing place management unit 14 of the nonvolatile memory module 12 transmits the WAKEUP packet to the volatile memory module 11 in the stand-by state. The volatile memory module 11 in the stand-by state is caused to be in an operational state upon receiving the WAKEUP packet and changes to a state to transmit the HELLO packet and HELLO response packet.

(S4: Path Determination Processing)

The V storing place management unit 13 of the volatile memory module 11 and NV storing place management unit 14 of the nonvolatile memory module 12 determine a data transfer path using failure information in the nonvolatile memory management table 1346 and the failure information and the number of paths in the volatile memory management table 1446.

Figure 9:
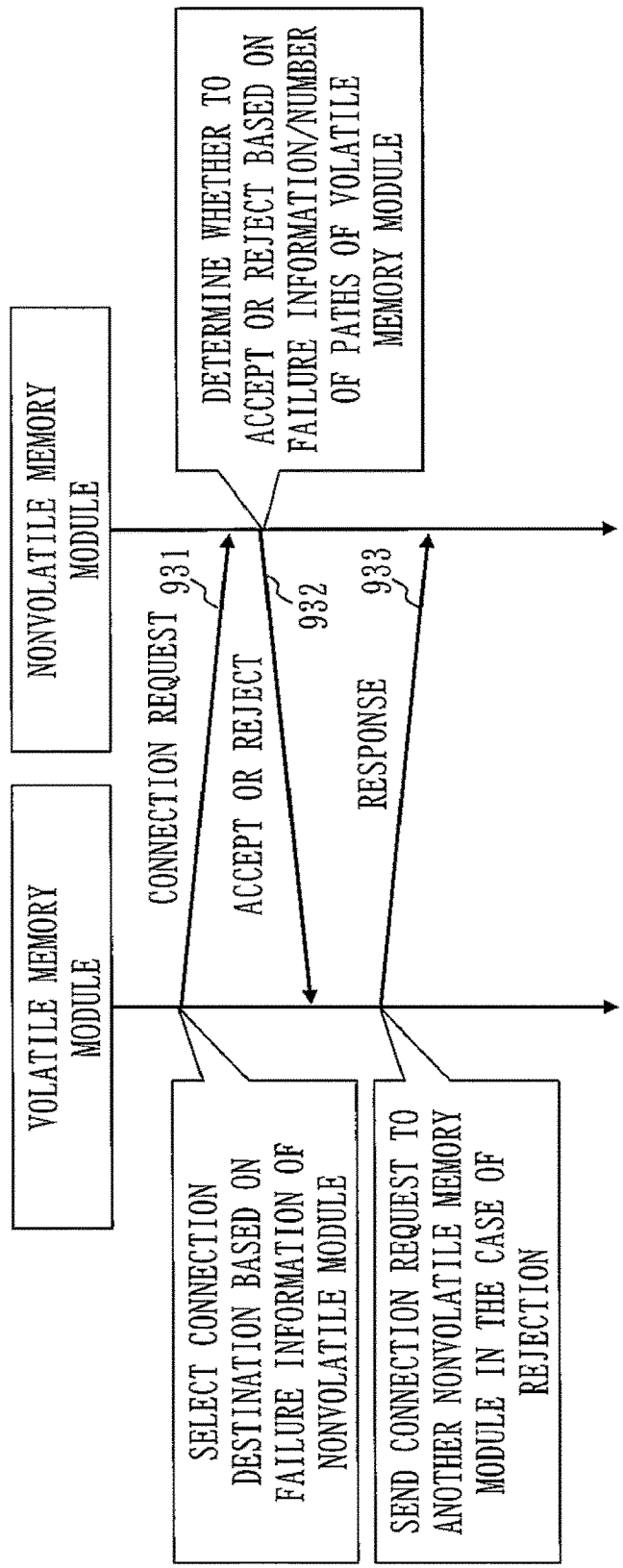
FIG. 9 is a diagram explaining determination processing of a data transfer path.

FIG. 9 is a diagram explaining determination processing of a data transfer path.

The V storing place management unit 13 of the volatile memory module 11 transmits the connection request packet (connection request message) in order to the nonvolatile memory module 12 indicated as not failed by the failure information in the nonvolatile memory management table 1346. For example, the V storing place management unit 13 of the volatile memory module 11 transmits the connection request packet in ascending order of the nonvolatile memory module numbers.

Here, the V storing place management unit 13 of the volatile memory module 11 counts, as the number of paths, the number of nonvolatile memory modules 12 indicated as not failed by the failure information in the nonvolatile memory management table 1346. The V storing place management unit 13 of the volatile memory module 11 then transmits the number of paths included in the connection request packet.

The NV storing place management unit 14 of the nonvolatile memory module 12 transmits the connection response packet indicating acceptance or rejection in response to the connection request packet.

The NV storing place management unit 14 of the nonvolatile memory module 12 transmits the connection response packet (connection acceptance message) indicating acceptance with regard to the connection request packet having the least number of paths of the received connection request packets, and transmits the connection response packet indicating rejection with regard to the rest of the connection request packets.

Incidentally, there are cases where the connection request packets have the same least number of paths. In this case, the NV storing place management unit 14 of the nonvolatile memory module 12 transmits the connection response packet indicating acceptance with regard to the connection request packet having the smallest volatile memory module number of the source volatile memory module 11.

The NV storing place management unit 14 of the nonvolatile memory module 12 updates the number of paths in the volatile memory management table 1446 according to the number of paths included in the received connection request packet. Moreover, the NV storing place management unit 14 of the nonvolatile memory module 12 updates the grant of use right in the volatile memory management table 1446 according to the transmitted connection response packet.

The V storing place management unit 13 of the volatile memory module 11 temporarily halts transmission of the connection request packet when receiving the connection response packet indicating acceptance. Meanwhile, the V storing place management unit 13 of the volatile memory module 11 transmits the connection request packet to the subsequent nonvolatile memory module 12 upon receiving the connection response packet indicating rejection.

When receiving the connection response packet, the V storing place management unit 13 of the volatile memory module 11 updates connection request in the nonvolatile memory management table 1346 to "sent" with regard to the source nonvolatile memory module 12 of the connection response packet.

When the connection response packet indicating acceptance has already been transmitted and the connection request packet having a smaller number of paths has been received, the NV storing place management unit 14 of the nonvolatile memory module 12 transmits, to the volatile memory module 11 to which the connection response packet indicating acceptance has already been transmitted, the connection response packet indicating rejection (connection withdrawal message). The NV storing place management unit 14 of the nonvolatile memory module 12 then transmits the connection response packet indicating acceptance in response to the connection request packet having the smaller number of paths.

In this case, the V storing place management unit 13 of the volatile memory module 11 having received the connection response packet indicating rejection restarts transmission of the connection request packet which has been temporarily halted.

FIG. 10 is a configuration diagram illustrating a connection request packet.

The connection request packet includes a nonvolatile memory module number of a destination, a volatile memory module number of a source, and the number of paths of the volatile memory module.

The nonvolatile memory module number of a destination is the nonvolatile memory module number of the destination nonvolatile memory module 12. The volatile memory module number of a source is the volatile memory module number of the source volatile memory module 11. The number of paths of the volatile memory module is the number of paths of the source volatile memory module 11.

FIG. 11 is a configuration diagram illustrating the connection response packet.

The connection response packet includes a volatile memory module number of a destination, a nonvolatile memory module number of a source, and whether connection is accepted.

The volatile memory module number of a destination is the volatile memory module number of the destination volatile memory module 11. The nonvolatile memory module number of a source is the nonvolatile memory module number of the source nonvolatile memory module 12. Information whether connection is accepted indicates acceptance or rejection.

Figure 12:
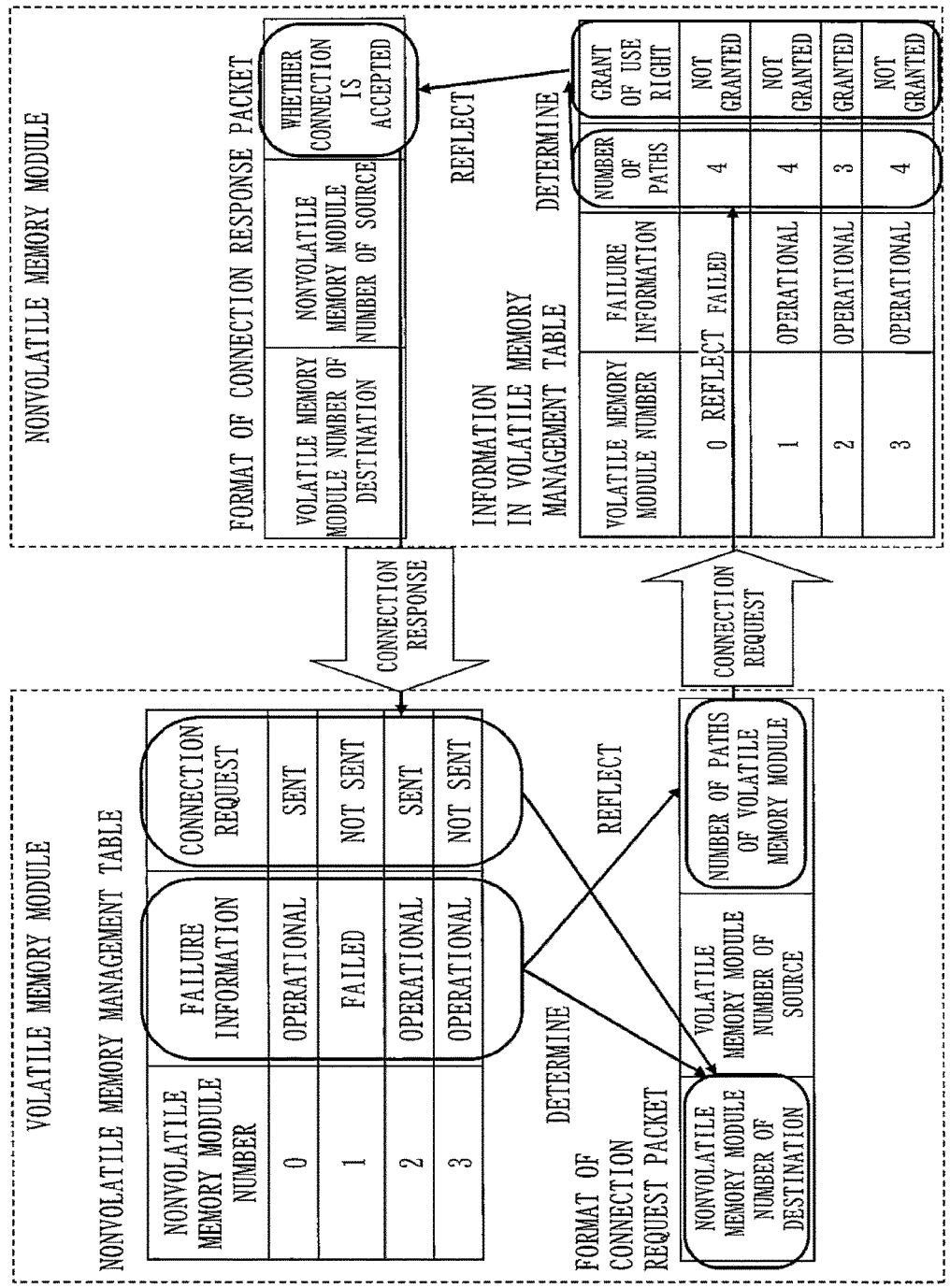
FIG. 12 is a diagram illustrating a relationship among the nonvolatile memory management table 1346, volatile memory management table 1446, connection request packet, and connection response packet.

FIG. 12 is a diagram illustrating a relationship among the nonvolatile memory management table 1346, volatile memory management table 1446, connection request packet, and connection response packet.

The nonvolatile memory module 12 indicated as operational by the failure information and the connection request is not sent thereto in the nonvolatile memory management table 1346 is selected as a destination of the connection request packet. The number of paths of volatile memory modules of the connection request packet is the number of nonvolatile memory modules 12 failure information of which is operational in the nonvolatile memory management table 1346.

The number of paths in the volatile memory management table 1446 is set at the number of paths of volatile memory modules of the connection request packet. Based on the number of paths having been set, whether to grant (acceptance) or not to grant (rejection) use right is determined. The determined grant of use right is reflected to whether to accept connection by the connection response packet.

Thereafter, connection request in the nonvolatile memory management table 1346 is updated to "sent" with regard to the source nonvolatile memory module 12 of the connection response packet.

(S5: Data Transfer Processing)

The V storing place management unit 13 of each of the volatile memory modules 11 transfers data temporarily stored in S1 to the source nonvolatile memory module 12 of the connection response packet, indicating acceptance, received in S4. Here, each of the volatile memory modules 11 is capable of transferring data in parallel.

Figure 13:
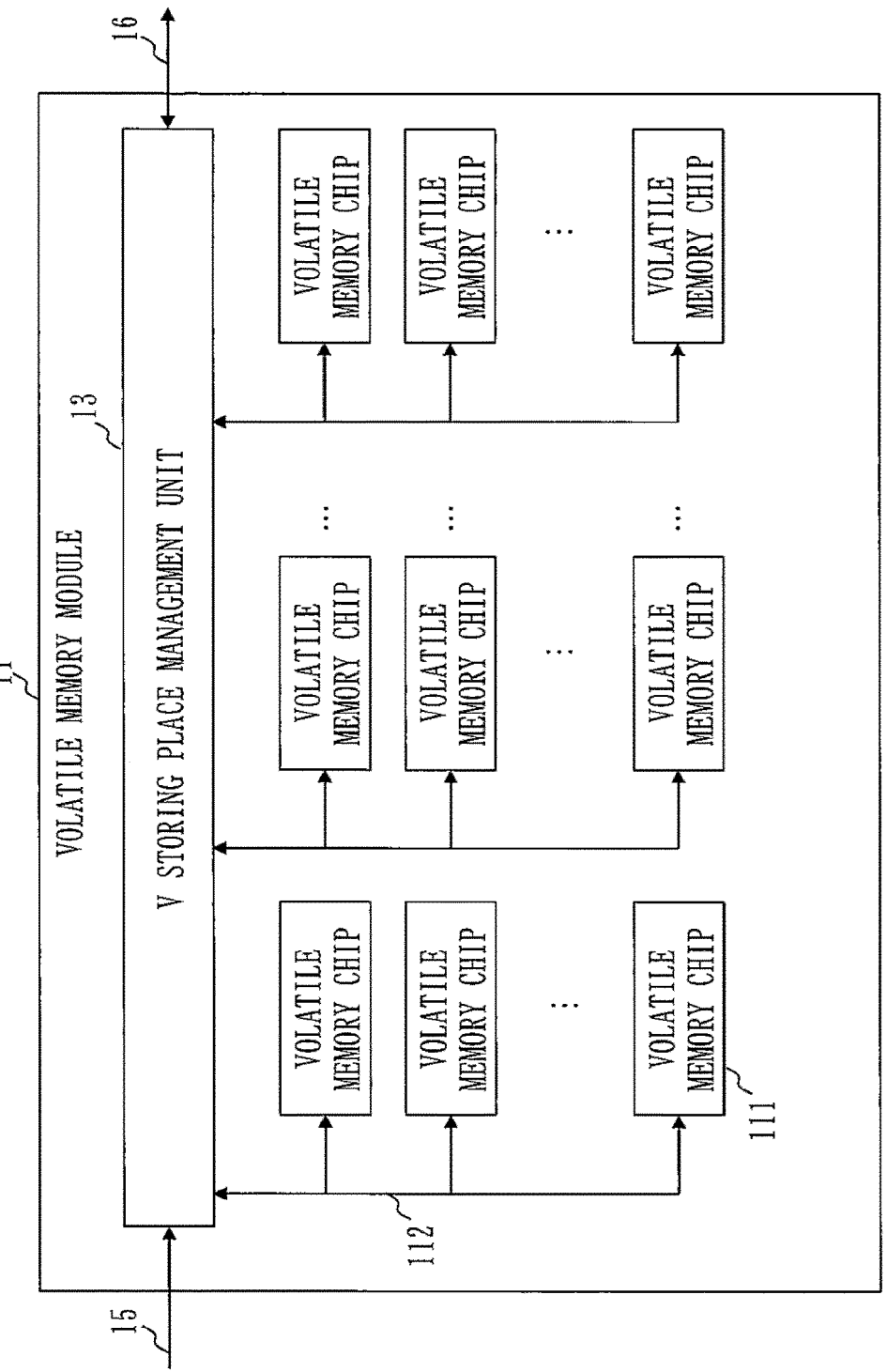
FIG. 13 is a configuration diagram illustrating a volatile memory module 11.

FIG. 13 is a configuration diagram illustrating the volatile memory module 11.

The volatile memory module 11 includes the V storing place management unit 13 and one or more volatile memory chips 111. The V storing place management unit 13 and each of the volatile memory chips 111 are connected by a volatile memory bus 112.

Data input via the external input bus 15 is transmitted to the V storing place management unit 13 and then transmitted to the volatile memory chip 111 via the volatile memory bus 112 and temporarily stored therein. When data is transmitted to the V storing place management unit 13, the V storing place management unit 13 executes the aforementioned living confirmation processing and path determination processing in order and determines the destination nonvolatile memory module 12. The V storing place management unit 13 reads the data temporarily stored in the volatile memory chip 111 and transmits to the determined nonvolatile memory module 12 via the inter-memory module bus 16.

Figure 14:
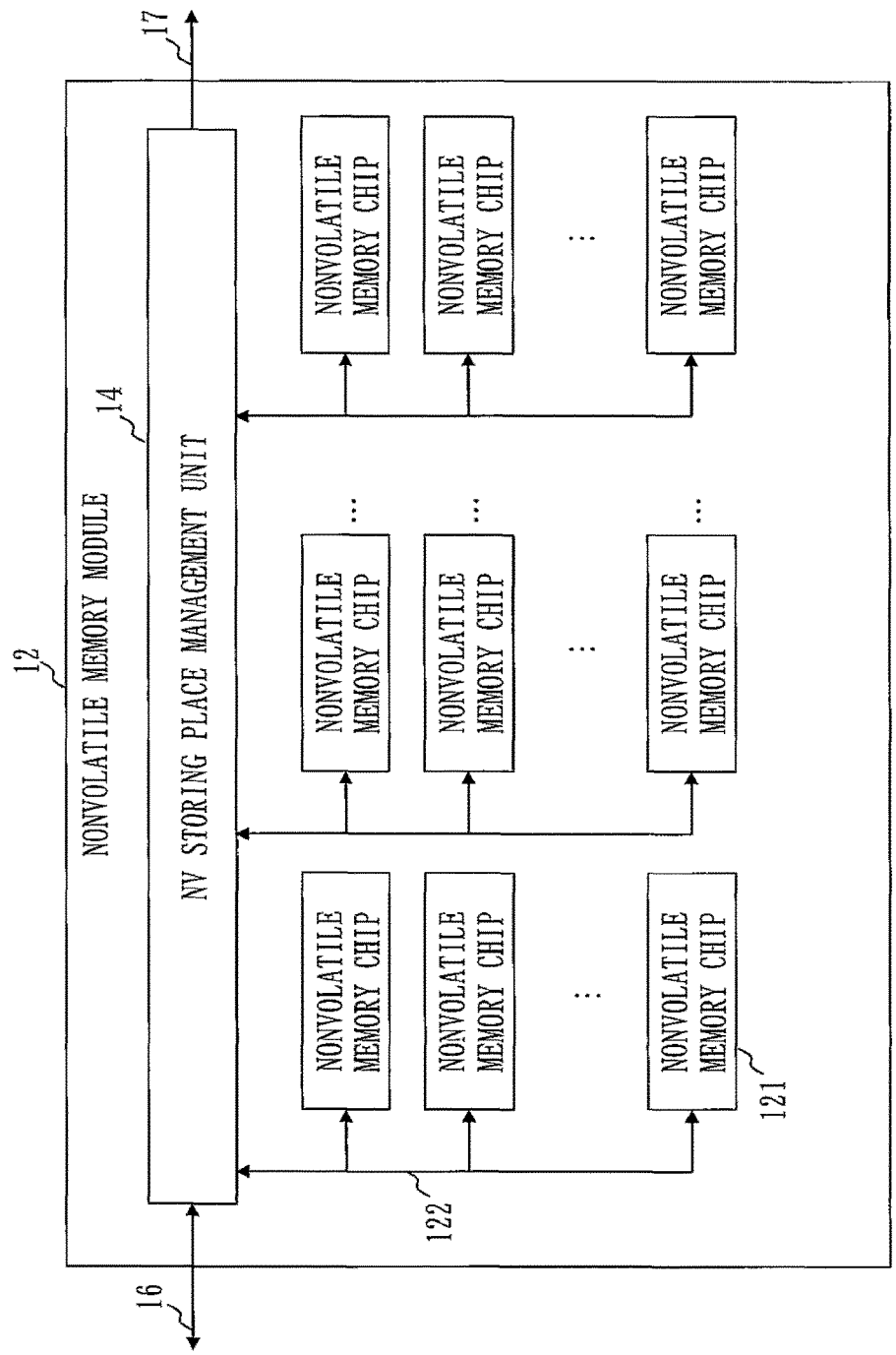
FIG. 14 is a configuration diagram illustrating a nonvolatile memory module 12.

FIG. 14 is a configuration diagram illustrating the nonvolatile memory module 12.

The nonvolatile memory module 12 includes the NV storing place management unit 14 and one or more nonvolatile memory chips 121. The NV storing place management unit 14 and each of the nonvolatile memory chips 121 are connected by a nonvolatile memory bus 122.

When the HELLO packet is transmitted via the inter-memory module bus 16, the NV storing place management unit 14 executes the aforementioned living confirmation processing and path determination processing in order and determines only one source volatile memory module 11. Data transmitted from the determined volatile memory module 11 is transmitted to the NV storing place management unit 14 and then transmitted to the nonvolatile memory chip 121 via the nonvolatile memory bus 122 and stored therein. The NV storing place management unit 14 reads the data stored in the nonvolatile memory chip 121 upon request and outputs data via the external output bus 17.

Figure 15:
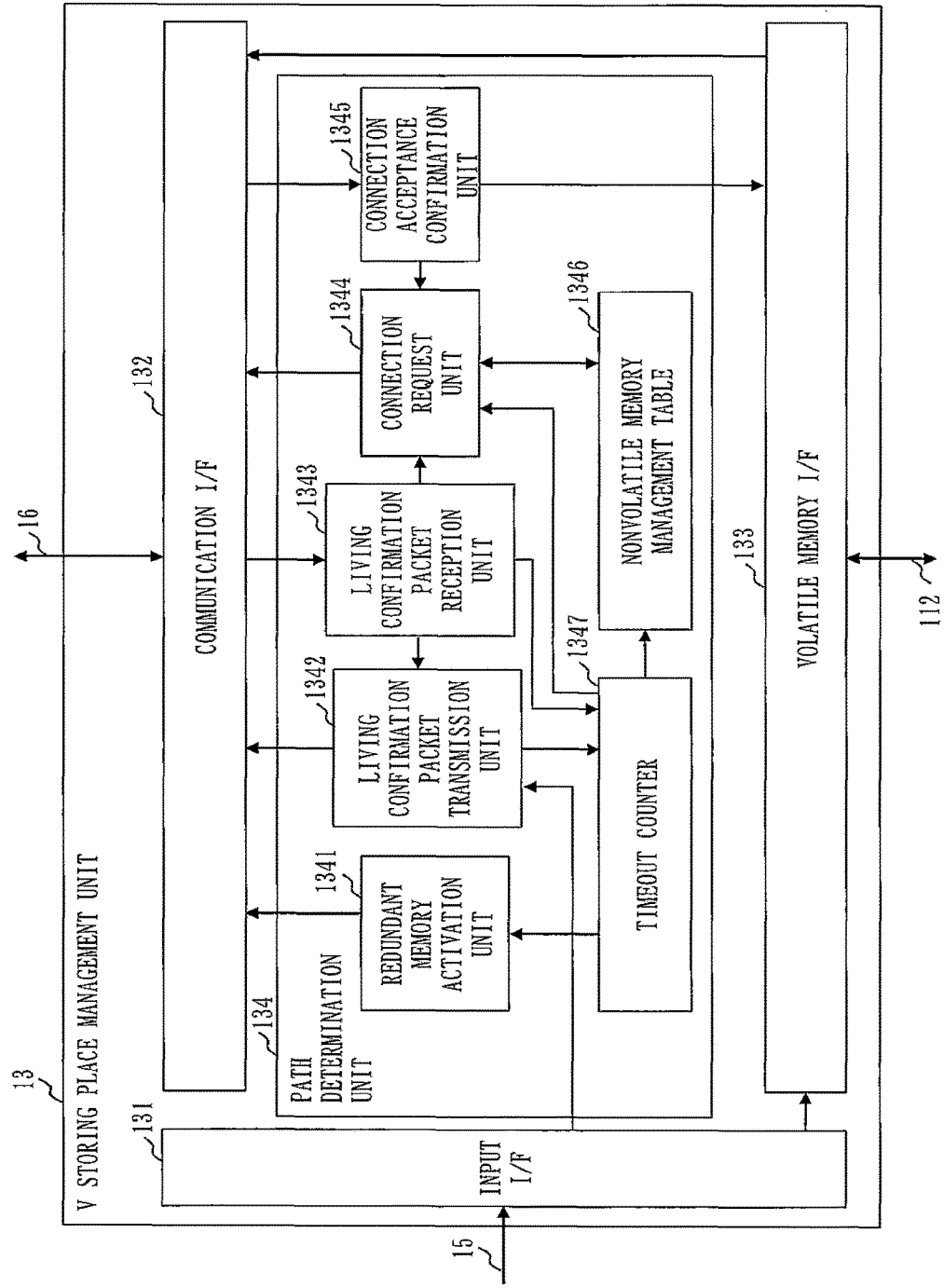
FIG. 15 is a configuration diagram illustrating a V storing place management unit 13.

FIG. 15 is a configuration diagram illustrating the V storing place management unit 13.

The V storing place management unit 13 includes an input I/F 131, communication I/F 132, volatile memory I/F 133, and path determination unit 134.

The input I/F 131 is an interface to receive data input from the external input bus 15. The communication I/F 132 is an interface to communicate with the NV storing place management unit 14 via the inter-memory module bus 16. The volatile memory I/F 133 is an interface to transmit/receive data to/from the volatile memory chip 111. The path determination unit 134 includes a function to execute the aforementioned living confirmation processing and path determination processing.

The path determination unit 134 includes a redundant memory activation unit 1341, living confirmation packet transmission unit 1342, living confirmation packet reception unit 1343, connection request unit 1344, connection acceptance confirmation unit 1345, nonvolatile memory management table 1346, and timeout counter 1347.

The redundant memory activation unit 1341 includes a function to activate the nonvolatile memory module 12 in the stand-by state when failure occurs in the nonvolatile memory module 12. The living confirmation packet transmission unit 1342, living confirmation packet reception unit 1343, and timeout counter 1347 include a function to execute the living confirmation processing. The connection request unit 1344, connection acceptance confirmation unit 1345, and nonvolatile memory management table 1346 include a function to execute the path determination processing.

When data is input from the external input bus 15, the input I/F 131 transmits a living confirmation processing start signal to the living confirmation packet transmission unit 1342. The input I/F 131 simultaneously transmits data to the volatile memory I/F 133. The volatile memory I/F 133 writes the transmitted data in the volatile memory chip 111 when the data is transmitted from the input I/F 131.

The living confirmation packet transmission unit 1342 transmits a HELLO packet transmission signal to the communication I/F 132 when receiving the living confirmation processing start signal from the input I/F 131. The living confirmation packet transmission unit 1342 simultaneously transmits a count start signal to the timeout counter 1347. The communication I/F 132 transmits the HELLO packet to all the connected nonvolatile memory modules 12 when receiving a HELLO packet transmission signal.

The timeout counter 1347 starts counting upon receiving the count start signal. The timeout counter 1347 includes the same number of counters as the number of nonvolatile memory modules 12 connected thereto and thus is capable of counting time for every nonvolatile memory module 12 connected thereto.

The communication I/F 132 transmits a living confirmation signal to the living confirmation packet reception unit 1343 when receiving the HELLO response packet from the nonvolatile memory module 12. The living confirmation packet reception unit 1343 transmits a count halt signal to the timeout counter 1347 when receiving the living confirmation signal from the communication I/F 132. The timeout counter 1347 halts the corresponding counter when receiving the count halt signal from the living confirmation packet reception unit 1343. The timeout counter 1347 simultaneously updates the failure information of the nonvolatile memory module 12 corresponding to the count halt signal in the nonvolatile memory management table 1346 to "operational".

The timeout counter 1347 determines timeout when a counted value exceeds a predetermined value. The timeout counter 1347 updates the failure information of the nonvolatile memory module 12 where timeout has occurred in the nonvolatile memory management table 1346 to "failed" when timeout occurs. The timeout counter 1347 further transmits a redundant memory activation signal to the redundant memory activation unit 1341 when timeout occurs.

The redundant memory activation unit 1341 transmits a WAKEUP packet transmission signal to the communication I/F 132 when receiving the redundant memory activation signal. The communication I/F 132 transmits the WAKEUP packet to the nonvolatile memory module 12 in the stand-by state when receiving the WAKEUP packet transmission signal.

The timeout counter 1347 transmits a living confirmation processing complete signal to the connection request unit 1344 when all the counters halt.

The communication I/F 132 transmits a HELLO packet reception signal to the living confirmation packet reception unit 1343 when the HELLO packet is input from the inter-memory module bus 16. The living confirmation packet reception unit 1343 transmits a HELLO response packet generation signal to the living confirmation packet transmission unit 1342 when receiving the HELLO packet reception signal from the communication I/F 132.

The living confirmation packet transmission unit 1342 transmits a HELLO response packet transmission signal to the communication I/F 132 when receiving the HELLO response packet generation signal from the living confirmation packet reception unit 1343. The communication I/F 132 transmits the HELLO response packet to all the connected nonvolatile memory modules 12 when receiving a HELLO response packet transmission signal.

The connection request unit 1344 updates all the connection requests in the nonvolatile memory management table 1346 to "not sent" when receiving the living confirmation processing complete signal from the timeout counter 1347.

The connection request unit 1344 transmits, to the communication I/F 132, a connection request packet transmission signal destination of which is the nonvolatile memory module 12 where failure information is "operational", the connection request is "not set", and the value of the nonvolatile memory module number is the smallest in the nonvolatile memory management table 1346. The communication I/F 132 transmits the connection request packet to the destination nonvolatile memory module 12 when receiving the connection request packet transmission signal from the connection request unit 1344.

The communication I/F 132 transmits a connection response signal to the connection acceptance confirmation unit 1345 when receiving the connection response packet from the inter-memory module bus 16. When receiving the connection response signal from the communication I/F 132, the connection acceptance confirmation unit 1345 performs operation corresponding to the content of the signal. The connection acceptance confirmation unit 1345 transmits a writing validation signal to the volatile memory I/F 133 when connection is accepted. The connection acceptance confirmation unit 1345 transmits a re-request signal to the connection request unit 1344 when connection is rejected. Furthermore, the connection acceptance confirmation unit 1345 updates connection request of the corresponding nonvolatile memory module 12 in the nonvolatile memory management table 1346 to "sent" when connection is rejected.

When receiving the re-request signal, the connection request unit 1344 generates connection request to the nonvolatile memory module 12 where failure information is "operational", the connection request is "not set", and the value of nonvolatile memory module number is the smallest in the nonvolatile memory management table 1346.

The volatile memory I/F 133 reads data from the volatile memory chip 111 while receiving the writing validation signal from the connection acceptance confirmation unit 1345 and transmits the data to the communication I/F 132. When receiving the data from the volatile memory I/F 211, the communication I/F 132 transmits data to the nonvolatile memory module 12 via the inter-memory module bus 16.

Figure 16:
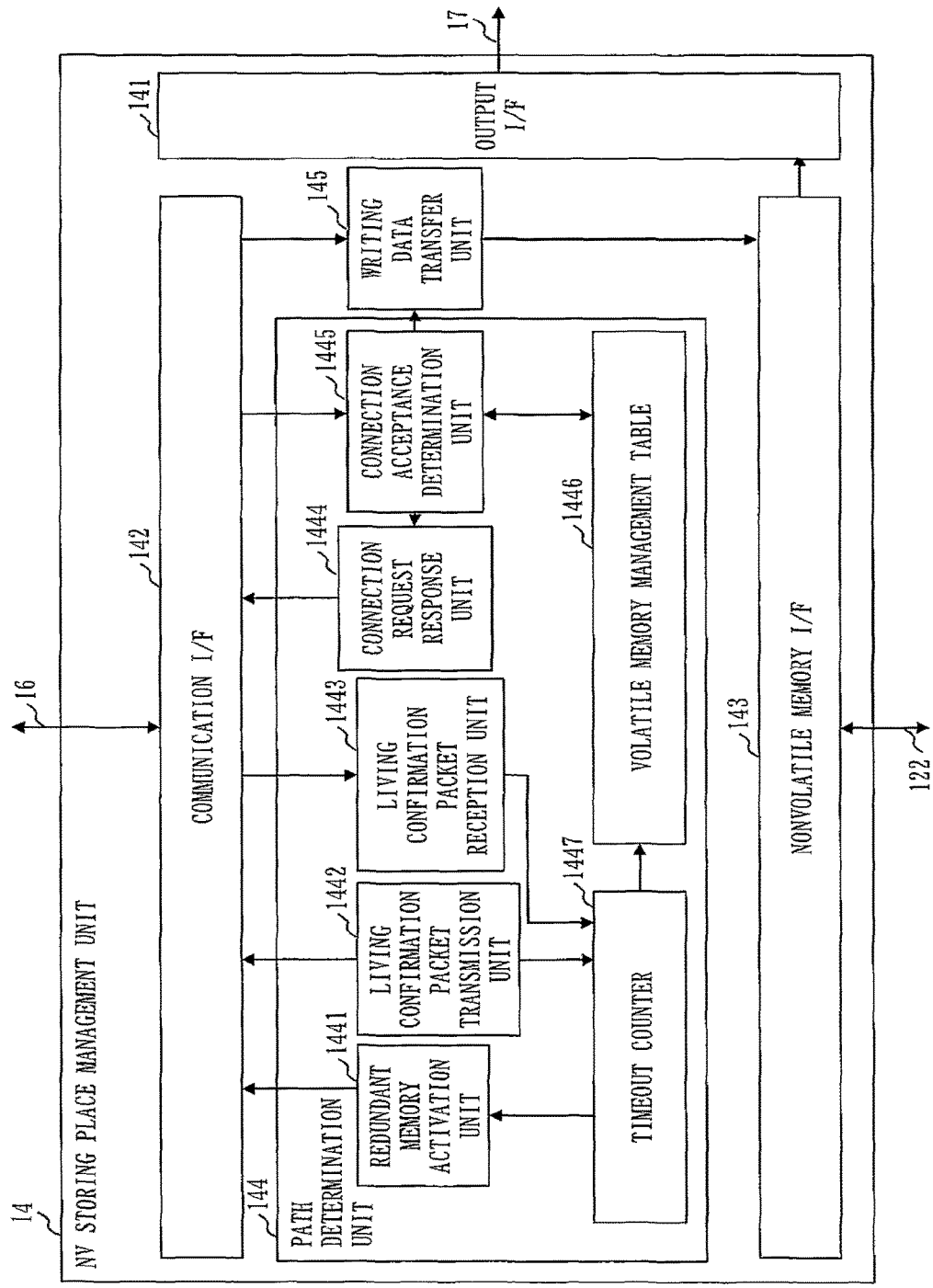
FIG. 16 is a configuration diagram illustrating a NV storing place management unit 14.

FIG. 16 is a configuration diagram illustrating the NV storing place management unit 14.

The NV storing place management unit 14 includes an output I/F 141, communication I/F 142, nonvolatile memory I/F 143, path determination unit 144, and writing data transfer unit 145.

The output I/F 141 is an interface to output data from the external output bus 17. The communication I/F 142 is an interface to communicate with the V storing place management unit 13 via the inter-memory module bus 16. The nonvolatile memory I/F 143 is an interface to transmit/ receive data to/from the nonvolatile memory chip 121. The path determination unit 144 includes a function to execute the aforementioned living confirmation processing and path determination processing. The writing data transfer unit 145 includes a function to control writing, to the nonvolatile memory chip 121, of data transmitted from the volatile memory module 11.

The path determination unit 144 includes a redundant memory activation unit 1441, living confirmation packet transmission unit 1442, living confirmation packet reception unit 1443, connection request response unit 1444, connection acceptance determination unit 1445, volatile memory management table 1446, and timeout counter 1447.

The redundant memory activation unit 1441 includes a function to activate the volatile memory module 11 in the stand-by state when failure occurs in the volatile memory module 11. The living confirmation packet transmission unit 1442, living confirmation packet reception unit 1443, and timeout counter 1447 include a function to execute the living confirmation processing. The connection request response unit 1444, connection acceptance determination unit 1445, and volatile memory management table 1446 include a function to execute the path determination processing.

The communication I/F 142 transmits a HELLO packet reception signal to the living confirmation packet reception unit 1443 when the HELLO packet is input from the inter-memory module bus 16. The living confirmation packet reception unit 1443 transmits a HELLO response packet generation signal and a living confirmation processing start signal to the living confirmation packet transmission unit 1442 when receiving the HELLO packet reception signal from the communication I/F 142.

The living confirmation packet transmission unit 1442 transmits a HELLO response packet transmission signal to the communication I/F 142 when receiving the HELLO response packet generation signal from the living confirmation packet reception unit 1443. The communication I/F 142 transmits the HELLO response packet to all the connected volatile memory modules 11 when receiving a HELLO response packet transmission signal.

Furthermore, the living confirmation packet transmission unit 1442 transmits a HELLO packet transmission signal to the communication IN 142 when receiving a living confirmation processing start signal from the living confirmation packet reception unit 1443. The living confirmation packet transmission unit 1442 simultaneously transmits a count start signal to the timeout counter 1447. The communication I/F 142 transmits the HELLO packet to all the connected volatile memory modules 11 when receiving the HELLO packet transmission signal.

The timeout counter 1447 starts counting when receiving the count start signal. The timeout counter 1447 includes the same number of counters as the number of volatile memory modules 11 connected thereto and thus is capable of counting time for every volatile memory module 11 connected thereto.

The communication I/F 142 transmits a living confirmation signal to the living confirmation packet reception unit 1443 when receiving the HELLO response packet from the volatile memory module 11. The living confirmation packet reception unit 1443 transmits a count halt signal to the timeout counter 1447 when receiving the living confirmation signal from the communication I/F 142. The timeout counter 1447 halts the corresponding counter when receiving the count halt signal from the living confirmation packet reception unit 1443. The timeout counter 1447 simultaneously updates the failure information of the volatile memory module 11 corresponding to the count halt signal in the volatile memory management table 1446 to "operational".

The timeout counter 1447 determines timeout when a counted value exceeds a predetermined value. The timeout counter 1447 updates the failure information of the volatile memory module 11 where timeout has occurred in the volatile memory management table 1446 to "failed" when timeout occurs. The timeout counter 1447 further transmits a redundant memory activation signal to the redundant memory activation unit 1441 when timeout occurs.

The redundant memory activation unit 1441 transmits a WAKEUP packet transmission signal to the communication I/F 142 when receiving the redundant memory activation signal. The communication I/F 142 transmits the WAKEUP packet to the volatile memory module 11 in the stand-by state when receiving the WAKEUP packet transmission signal.

The communication I/F 142 transmits a connection request reception signal to the connection acceptance determination unit 1445 when receiving the connection request packet from the inter-memory module bus 16. When receiving the connection request reception signal from the communication I/F 142, the connection acceptance determination unit 1445 updates the number of paths of the source volatile memory module 11 of the connection request packet in the volatile memory management table 1446 to the number of paths of the connection request packet. The connection acceptance determination unit 1445 confirms whether the source volatile memory module 11 of the connection request packet has the smallest number of paths and the smallest volatile memory module number in the volatile memory management table 1446. The connection acceptance determination unit 1445 transmits a connection acceptance signal to the connection request response unit 1444 when the volatile memory module 11 has the smallest number of paths and the smallest volatile memory module number or transmits a connection rejection signal to the connection request response unit 1444 in other cases.

When receiving the connection acceptance signal from the connection acceptance determination unit 1445, the connection request response unit 1444 transmits a connection response packet transmission signal specifying connection acceptance to the communication I/F 142. On the other hand, when receiving the connection rejection signal from the connection acceptance determination unit 1445, the connection request response unit 1444 transmits the connection response packet transmission signal specifying connection rejection to the communication I/F 142. The communication I/F 142 transmits the connection response packet to the source volatile memory I/F 133 of the connection request packet when receiving the connection response packet transmission signal from the connection request response unit 1444.

Incidentally, the connection acceptance determination unit 1445 transmits, to the connection request response unit 1444, a connection rejection signal for the volatile memory module 11 to which the connection acceptance signal has been once transmitted when further receiving a superseding connection request reception signal after having transmitted the connection acceptance signal. Thereafter, the connection acceptance determination unit 1445 transmits, to the connection request response unit 1444, a connection acceptance signal for the source volatile memory module 11 of the connection request packet.

The connection acceptance determination unit 1445 asserts a writing validation signal to the writing data transfer unit 145 when transmitting the connection acceptance signal. The communication I/F 142 receives data from the inter-memory module bus 16 and transfers the data to the writing data transfer unit 145. The writing data transfer unit 145 transfers, to the nonvolatile memory I/F 143, the data transferred from the communication I/F 142 while the writing validation signal is asserted by the connection acceptance determination unit 1445. The writing data transfer unit 145 discards data transferred from the communication I/F 142 while the writing validation signal is de-asserted by the connection acceptance determination unit 1445.

The nonvolatile memory I/F 143 writes the data in the nonvolatile memory chip 121 when the data is transferred from the writing data transfer unit 145.

The output I/F 141 transmits read request to the nonvolatile memory I/F 143 when receiving read request of data from the external output bus 17. The nonvolatile memory I/F 143 reads data from the nonvolatile memory chip 121 when receiving read request from the output I/F 141 and transmits the data to the output I/F 141. The output I/F 141 transmits the data to the external output bus 17 when receiving the data from the nonvolatile memory I/F 143.

In this manner, in the memory system 10 according to the first embodiment, each of the volatile memory modules 11 and each of the nonvolatile memory modules 12 autonomously determine a data transfer path by three-way handshaking. Therefore, a mechanism to integrally manage/control information such as data storing places and a crossbar switch circuit are not required. As a result, when the mechanism to integrally manage/control information such as data storing places or the crossbar switch circuit fails, the entire memory system 10 does not halt its operation.

Also, when a failed volatile memory module 11 is found, the nonvolatile memory module 12 activates the volatile memory module 11 in the stand-by state. Similarly, when the failed nonvolatile memory module 12 is found, the volatile memory module 11 activates the nonvolatile memory module 12 in the stand-by state.

This allows for preventing deterioration of performance when a part of the volatile memory modules 11 or a part of the nonvolatile memory modules 12 fails. Moreover, the excessive volatile memory module 11 or nonvolatile memory module 12 can be in the stand-by state, thereby allowing for reducing unnecessary power consumption.

Incidentally, in all transmission units described as "x packet" in the descriptions above, a "packet type" field to indicate the type of a packet is included. Each of the storing place management units determines the type of a packet from the "packet type" field.

Also, a function described as "x unit" in the descriptions above may be implemented by software or by a circuit or device. When a function described as "x unit" is implemented by software, software implementing the function described as "x unit" is stored in a storage device in the memory system 10 (e.g. nonvolatile memory module 12 or the like) and read and executed by an arithmetic unit (e.g. CPU) included in the memory system 10.

REFERENCE SIGNS LIST

10: memory system, 11: volatile memory module, 111: volatile memory chip, 112: volatile memory bus, 12: nonvolatile memory module, 121: nonvolatile memory chip, 122: nonvolatile memory bus, 13: V storing place management unit, 131: input I/F, 132: communication I/F, 133: volatile memory I/F, 134: path determination unit, 1341: redundant memory activation unit, 1342: living confirmation packet transmission unit, 1343: living confirmation packet reception unit, 1344: connection request unit, 1345: connection acceptance confirmation unit, 1346: nonvolatile memory management table, 1347: timeout counter, 14: NV storing place management unit, 141: output I/F, 142: communication I/F, 143: nonvolatile memory I/F, 144: path determination unit, 145: writing data transfer unit, 1441: redundant memory activation unit, 1442: living confirmation packet transmission unit, 1443: living confirmation packet reception unit, 1444: connection request response unit, 1445: connection acceptance determination unit, 1446: volatile memory management table, 1447: timeout counter, 15: external input bus, 16: inter-memory module bus, and 17: external output bus

The invention claimed is:

1. A data storage device comprising:
   a plurality of first memory modules to temporarily store data, each of the plurality of first memory modules including a first storing place manager and volatile semiconductor memory; and
   a plurality of second memory modules to store data stored in each of the first memory modules, each of the plurality of second memory modules including a second storing place manager and non-volatile semiconductor memory,
   wherein the first storing place managers included in the first memory modules and the second storing place managers included in the second memory modules communicate and determine, for each first memory module storing data, a destination second memory module as a destination of the data,
   the first storing place manager of each of the first memory modules transmits a living confirmation message and a connection request message to each of the second memory modules,
   each of the second storing place managers included in the second memory modules transmits, to the first storing place manager of each of the first memory modules, a connection acceptance message indicating an acceptance to be the destination second memory module, and
   each of the first memory modules transmits the data to a corresponding destination second memory module determined as the destination of data.

2. The data storage device according to claim 1, wherein the first storing place manager transmits the connection request message including a number of responses to the living confirmation message received.

3. The data storage device according to claim 2, wherein each of the second storing place managers transmits the connection acceptance message to the first storing place manager having a smallest number of received responses, and when the connection acceptance message has already been transmitted to the first storing place manager and the connection request message is received from the first storing place manager having the smallest number of received responses, transmits the connection acceptance message to the first storing place manager having the smallest number of received responses and transmits a connection withdrawal message to withdraw to be the destination second memory module to the first storing place manager to which the connection acceptance message has already been transmitted, and
   the first storing place manager restarts transmission of the connection request message upon receiving the connection withdrawal message.

4. The data storage device according to claim 1, wherein
the second memory modules include at least one secondary module in a stand-by state for back-up, and
when there is a second memory module which has not responded to the living confirmation message, the first storing place manager transmits an activation message to the at least one second memory module in the stand-by state and causes the at least one second memory module in the stand-by state to be operational.

5. The data storage device according to claim 1, wherein the first memory modules include at least one first memory module in a stand-by state for back-up, and
each of the second storing place manager transmits a living confirmation message to each of the first memory modules and, when there is the first memory module which has not responded to the living confirmation message, transmits an activation message to the at least one first memory module in the stand-by state to cause the at least one first memory module in the stand-by state to be operational.

6. The data storage device according to claim 1, wherein first memory modules are connected to fewer than all of the second memory modules.

7. The data storage device according to claim 1, wherein the volatile semiconductor memory includes DRAM memory, and the non-volatile semiconductor memory includes FLASH memory.

* * * * *